(12) United States Patent
Jia et al.

(10) Patent No.: US 12,499,949 B2
(45) Date of Patent: Dec. 16, 2025

(54) MEMORY DEVICES AND OPERATING METHODS THEREOF, MEMORY SYSTEMS

(71) Applicant: YANGTZE MEMORY TECHNOLOGIES CO., LTD., Wuhan (CN)

(72) Inventors: Jianquan Jia, Wuhan (CN); XiangNan Zhao, Wuhan (CN); Feng Xu, Wuhan (CN); Yuanyuan Min, Wuhan (CN); Ying Cui, Wuhan (CN); Chenhui Li, Wuhan (CN); Wei Qi, Wuhan (CN); Junbao Wang, Wuhan (CN); Lei Jin, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 181 days.

(21) Appl. No.: 18/544,032

(22) Filed: Dec. 18, 2023

(65) Prior Publication Data
US 2025/0069662 A1 Feb. 27, 2025

(30) Foreign Application Priority Data
Aug. 21, 2023 (CN) .......................... 202311064887.6

(51) Int. Cl.
*G11C 16/10* (2006.01)
*G11C 16/04* (2006.01)

(52) U.S. Cl.
CPC .......... *G11C 16/10* (2013.01); *G11C 16/0483* (2013.01)

(58) Field of Classification Search
CPC .................................................. G11C 16/0483
See application file for complete search history.

(56) References Cited

U.S. PATENT DOCUMENTS

2021/0174887 A1* 6/2021 Sanada .............. G11C 16/0483

* cited by examiner

Primary Examiner — Jason Lappas
(74) Attorney, Agent, or Firm — Conley Rose, P.C.

(57) ABSTRACT

The present disclosure provides a memory device, a memory system, and an operation method of a memory device, and relates to the technical field of semiconductor chips. The memory device includes a memory cell array including a source layer, a bottom select gate layer, and a gate layer, and the bottom select gate layer is located between the source layer and the gate layer, wherein the bottom select gate layer includes a plurality of bottom select gates, and a bottom select gate of a first memory string and a bottom select gate of a second memory string are connected with a same select line; and a peripheral circuit coupled to the memory cell array, wherein the peripheral circuit is configured to apply a selection voltage to the select line to control the first memory string and the second memory string.

20 Claims, 10 Drawing Sheets

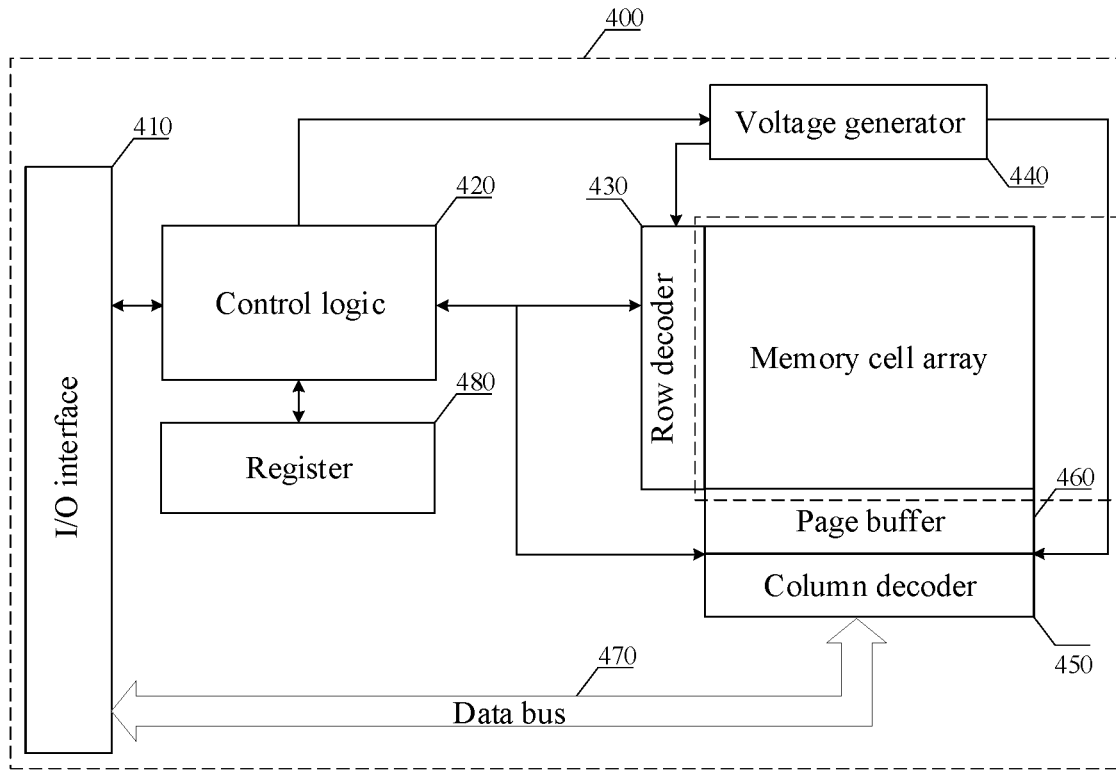

FIG.16

```
┌─────────────────────────────────────────────────────────┐  ┌─ S501
│ Program a first bottom select gate and a second bottom   │ /
│ select gate to make the first bottom select gate and the │
│ second bottom select gate be programmed to different     │
│ target threshold voltages                                │
└─────────────────────────────────────────────────────────┘
                            ↓
┌─────────────────────────────────────────────────────────┐  ┌─ S510
│ Apply different voltages to a first select line and a    │ /
│ second select line                                       │
└─────────────────────────────────────────────────────────┘
```

FIG.17

MEMORY DEVICES AND OPERATING METHODS THEREOF, MEMORY SYSTEMS

CROSS-REFERENCE TO RELATED APPLICATIONS

This application claims the benefit of priority to China Patent Application No. 2023110648876, filed on Aug. 21, 2023, which is incorporated herein by reference in its entirety.

TECHNICAL FIELD

The present disclosure relates to the technical field of semiconductor chips, and particularly to memory devices, a memory system and a method of operating a memory device.

BACKGROUND

At present, with continuous development of a three-dimensional flash memory (3D NAND), the density of memory cells is increasingly higher. In order to improve product performance, a manufacturer desires that the programming time is as short as possible during programming. However, a complementary metal oxide semiconductor circuit design also continues to scale downward in size. Due to a reduction in a peripheral circuit area, a driving capability of an array voltage is limited, leading to the increased programming time.

SUMMARY

According to one aspect of the present, a memory device is provided. The memory device may include a memory cell array. The memory cell array may include a source layer, a bottom select gate layer and a gate layer. The bottom select gate layer may be located between the source layer and the gate layer, wherein the bottom select gate layer may include bottom select gates. The bottom select gates respectively correspond to memory strings. The memory strings may include a first memory string and a second memory string. The memory may include a peripheral circuit. A bottom select gate of the first memory string and a bottom select gates of the second memory string may be connected with a same select line. The peripheral circuit may be configured to apply a selection voltage to the select line to control the first memory string and the second memory string.

In some examples, the bottom select gate layer may include a first bottom select gate layer and a second bottom select gate layer. The second bottom select gate may be disposed between the first bottom select gate layer and the source layer. The first bottom select gate layer may include first bottom select gates. The second bottom select gate layer may include second bottom select gates. A first bottom select gate of the first memory string and a first bottom select gate of the second memory string may be connected with a first select line. A second bottom select gate of the first memory string and a second bottom select gate of the second memory string may be connected with a second select line.

In some examples, threshold voltages of the first bottom select gates in the first memory string may be greater than threshold voltages of the first bottom select gates in the second memory string. Threshold voltages of the second bottom select gates in the first memory string may be less than threshold voltages of the second bottom select gates in the second memory string.

In some examples, the bottom select gate layer may include a third bottom select gate layer. The third bottom select gate layer may include third bottom select gates. A third bottom select gate of the first memory string and a third bottom select gate of the second memory string may be connected with a third select line. The third bottom select gate layer is disposed between the second bottom select gate layer and the source layer. Threshold voltages of the third bottom select gates connected with the third select line are the same.

In some examples, the threshold voltage of the first bottom select gate and the threshold voltage of the second bottom select gate may be less than the threshold voltage of the third bottom select gate.

In some examples, the bottom select gates may include dummy select gates, wherein at least one of the dummy select gates may be disposed between any two of the bottom select gates with different threshold voltages, and the dummy select gate of the first memory string and the dummy select gate of the second memory string may be connected with a dummy word line.

In some examples, the number of the first bottom select gates and the second bottom select gates in the memory string is one or more.

In some examples, the number of the third bottom select gates in the memory string is one or more.

In some examples, the first memory string and the second memory string may be located in different finger memory areas.

According to another aspect of the present disclosure, an operation method of a memory device is provided, which may include:

programming a first bottom select gate and a second bottom select gate to make the first bottom select gate and the second bottom select gate be programmed to different target threshold voltages; and applying different voltages to a first select line and a second select line, wherein the first select line is coupled with the first bottom select gate, and the second select line is coupled with the second bottom select gate.

In some examples, a threshold voltage of the first bottom select gate in a first memory string is greater than a threshold voltage of the first bottom select gate in a second memory string, and a threshold voltage of the second bottom select gate in the first memory string is less than a threshold voltage of the second bottom select gate in the second memory string, and applying the different voltages to the first select line and the second select line may include:

applying a first voltage to the first select line, and applying a second voltage to the second select line; or applying the second voltage to the first select line, and applying the first voltage to the second select line, wherein the first voltage is greater than the second voltage.

In some examples, the method further may include:

applying a third voltage to a third select line, wherein the third select line is coupled with a third bottom select gate; and applying a pass voltage to a dummy word line, wherein the dummy word line is coupled with a dummy select gate.

In some examples, programming the first bottom select gate and the second bottom select gate to make the first bottom select gate and the second bottom select gate be programmed to the different target threshold voltages may include:

programming the first bottom select gate of the first memory string and the first bottom select gate of the second memory string when a first program voltage is applied to the first select line, and programming the first bottom select gate of the first memory string and preventing the first bottom select gate of the second memory string from being programmed when a second program voltage is applied to the first select line.

In some examples, programming the first bottom select gate of the first memory string and the first bottom select gate of the second memory string may include:

applying a turn-on voltage to a first string select line and a second string select line, wherein the first string select line may be coupled to a top select gate of the first memory string, and the second string select line may be coupled to a top select gate of the second memory string.

In some examples, programming the first bottom select gate of the first memory string and preventing the first bottom select gate of the second memory string from being programmed may include:

applying a turn-on voltage to a first string select line and a turn-off voltage to a second string select line, wherein the first string select line may be coupled to the top select gate of the first memory string, and the second string select line may be coupled to the top select gate of the second memory string.

According to a further aspect of the present disclosure, a memory system is provided. The memory system may include one or more memory devices. The one or more memory devices may each include a memory cell array. The memory cell array may include a source layer, a bottom select gate layer and a gate layer. The bottom select gate layer may be located between the source layer and the gate layer, wherein the bottom select gate layer may include bottom select gates. The bottom select gates respectively correspond to memory strings. The memory strings may include a first memory string and a second memory string. The memory may include a peripheral circuit. A bottom select gate of the first memory string and a bottom select gates of the second memory string may be connected with a same select line. The peripheral circuit may be configured to apply a selection voltage to the select line to control the first memory string and the second memory string. The memory system may include a memory controller coupled to the memory devices and configured to control the memory devices.

According to a further aspect of the present disclosure, a computer readable storage medium is provided. The computer readable storage medium stores computer executable instructions that, after being executed, can implement the method of any example in the above aspect.

According to a further aspect of the present disclosure, a computer apparatus is provided, which may include a processor, and a read-only storage medium coupled with the processor, and the read-only storage medium stores executable instructions that, when being executed by the processor, can implement the method of any example in the above aspect.

BRIEF DESCRIPTION OF THE DRAWINGS

FIG. 16 is a schematic structural diagram of a memory cell array and a peripheral circuit provided by examples of the present disclosure; and FIG. 17 is a flow diagram of an operation method of a memory of the present disclosure.

DETAILED DESCRIPTION

Figure 1:
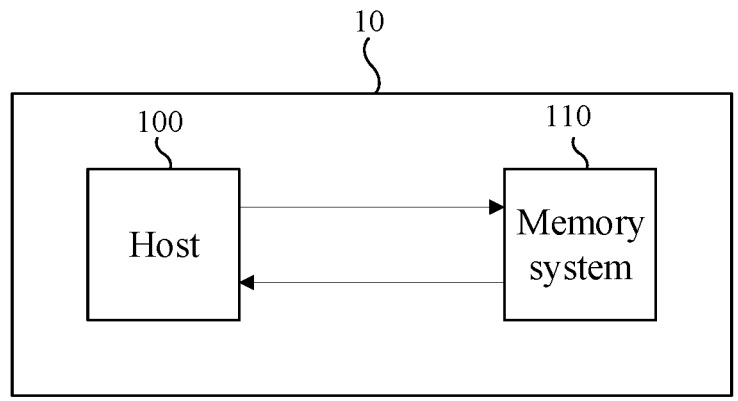
FIG. 1 is a block diagram of an electronic apparatus according to some examples of the present disclosure.

The technical solutions in some examples of the present disclosure will be described below clearly and completely in conjunction with the drawings. Apparently, the examples described are only part of, but not all of, the examples of the present disclosure. All other examples obtained by those of ordinary skills in the art based on the examples provided by the present disclosure shall fall in the scope of protection of the present disclosure.

Unless otherwise specified in the context, throughout the specification and the claims, the term "comprise" is interpreted as an open and inclusive meaning, i.e., "including, but not limited to". In the description of the specification, the terms "one example", "some examples", "an example", "in an example", or "some examples" indicate that particular features, structures, materials, or characteristics related to the example are included in at least one example of the present disclosure. The schematic representation of the above terms may not necessarily refer to the same example. Furthermore, these particular features, structures, materials, or characteristics may be included in one or more examples in any suitable manner.

In the following, the terms "first" and "second" are only for the purpose of description, and cannot be construed as indicating or implying relative importance or implicitly indicated the number of indicated technical features. Thus, features defined by "first" and "second" may explicitly or implicitly include one or more of such features. In the description of the examples of the present disclosure, "a plurality of" means two or more, unless otherwise stated.

In description of some examples, expressions of "coupled" and derivatives thereof may be used. For example, the term "coupled" may be used in the description of some examples to indicate that two or more components have a direct physical contact or electrical contact. In this case, "coupled" may be also described as "connected". Moreover, the term "coupled" may also mean that two or more components have no direct contact with each other, but still cooperate or interact with each other. The examples disclosed herein are not necessarily limited to the content herein.

The expressions "At least one of A, B and C" and "at least one of A, B or C" have the same meaning, both including the following combinations of A, B and C: only A, only B, only C, a combination of A and B, a combination of A and C, a combination of B and C, and a combination of A, B and C.

The expression "A and/or B" includes the following three combinations: only A, only B, and a combination of A and B. The use of "suitable for" or "configured to" herein means an open and inclusive language, and does not exclude an apparatus suitable for performing or configured to perform additional tasks or steps. In addition, the use of "based on" means openness and inclusiveness, as processes, steps, calculations, or other actions "based on" one or more conditions or values may be based on an additional condition or exceeded value in practice.

The use of "configured to" herein means open and inclusive language, and does not exclude an apparatus suitable for performing or configured to perform additional tasks or steps.

Examples of the present disclosure provide an electronic apparatus that may be, for example, any one of a cellphone, a desktop computer, a tablet computer, a notebook computer, a server, a vehicle apparatus, a wearable apparatus (e.g., a smart watch, a smart bracelet, smart glasses, etc.), a mobile power supply, a gaming machine, a digital multimedia player, etc. Referring to FIG. 1, FIG. 1 shows a schematic diagram of an electronic apparatus 10 provided by examples of the present disclosure. The electronic apparatus 10 may include a host 100 and a memory system 110. The host 100 is coupled with the memory system 110 to write data into the memory system 110 or read data stored in the memory system 110. The host is also called a master apparatus, and the memory system is also called a slave apparatus. In the electronic apparatus, the slave apparatus is accessible by different master apparatuses. For example, taking the electronic apparatus as a cellphone as an example, a central processing unit (CPU), a digital signal processor (DSP) and the like of the cellphone can access the memory system as hosts.

Figure 2:
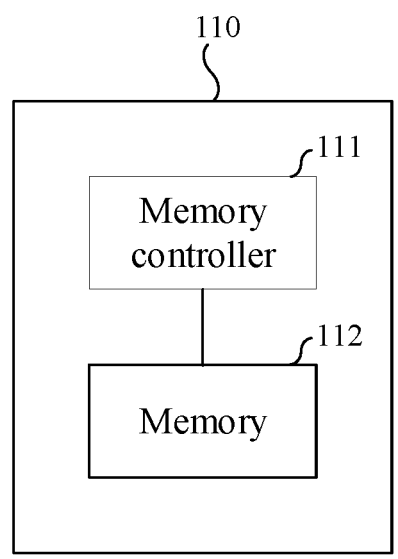
FIG. 2 is a block diagram of a memory system according to some examples of the present disclosure.

In an example, referring to FIG. 2, FIG. 2 shows a schematic diagram of the memory system 110 provided by examples of the present disclosure. The memory system 110 may include a memory controller 111 and a memory device (also referred as "a memory") 112, wherein the memory controller 111 is coupled to the memory 112 to control the memory 112 to store data. The memory 112 may be a 2-dimensional (2D) memory or a 3-dimensional (3D) memory.

The memory system 110 may be integrated into various types of storage apparatuses, for example, be included in the same package (e.g., a Universal Flash Storage (UFS) package or an Embedded Multi Media Card (eMMC) package). That is, the memory system 110 may be applied to and packaged into different types of electronic products, for example, a mobile phone (e.g., a cellphone), a desktop computer, a tablet computer, a notebook computer, a server, a vehicle apparatus, a gaming console, a printer, a positioning apparatus, a wearable apparatus, a smart sensor, a mobile power supply, a Virtual Reality (VR) apparatus, an Augmented Reality (AR) apparatus, or any other suitable electronic apparatuses having memories therein.

In some examples, the memory system 110 may include a memory controller 111 and one memory 112, and may be integrated into a memory card. The memory card includes any one of a Personal Computer Memory Card International Association (PCMCIA) card (a PC card for short), a Compact Flash (CF) card, a Smart Media (SM) card, a memory stick, a Multi Media Card (MMC), a Secure Digital (SD) memory card and a UFS.

Figure 3:
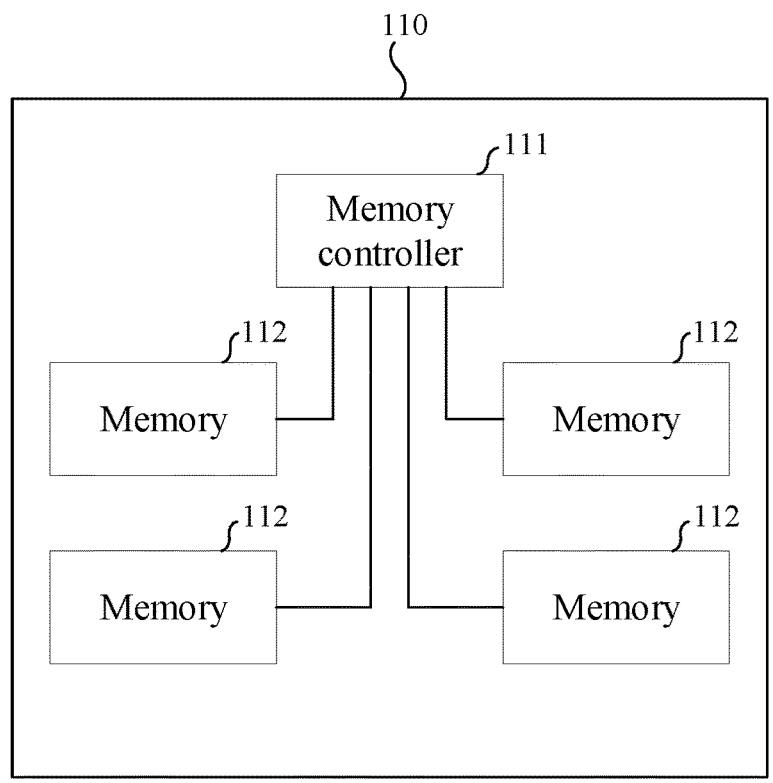
FIG. 3 is a block diagram of another memory system according to some examples of the present disclosure.

In some other examples, referring to FIG. 3, the memory system 110 may include a memory controller 111 and a plurality of memories 112, and is integrated into a solid state drive (SSD).

In the memory system 110, in some examples, the memory controller 111 is configured for operating in a low duty-cycle environment, such as SD cards, CF cards, Universal Serial Bus (USB) flash drives, or other media for use in electronic apparatuses, such as personal computers, digital cameras, mobile phones, etc.

In some other examples, the memory controller 111 is configured for operating in high duty-cycle environment like SSDs or eMMCs used as data memories for mobile apparatuses, such as smartphones, tablet computers, notebook computers, etc., and enterprise memory arrays.

In some examples, the memory controller 111 may be configured to manage the data stored in the memories 112 and communicate with an external apparatus (e.g., the host 100). In some examples, the memory controller 111 may be further configured to control operations of the memories 112, such as read, erase, and program operations.

In some examples, the memory controller 111 may be further configured to manage various functions with respect to data stored or to be stored in the memories 112, including at least one of bad-block management, garbage collection (GC), logical-to-physical address conversion, and wear leveling. In some examples, the memory controller 111 is further configured to process error correction codes with respect to the data read from or written to the memories 112.

Moreover, the memory controller 111 may communicate with an external apparatus (e.g., the host 100) through at least one of various interface protocols. It is to be noted that, the interface protocols include at least one of a Universal Serial Bus (USB) protocol, a Microsoft Management Console (MMC) protocol, a Peripheral Component Interconnection (PCI) protocol, a Peripheral Component Interconnection-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol and a Firewire protocol.

In an example, taking the storage medium of the memories 112 as a flash as an example, a basic memory cell of the flash may include a floating gate field effect transistor or a charge trapping transistor, etc. The examples of the present disclosure are introduced by taking the charge trapping transistor as an example.

Figure 4:
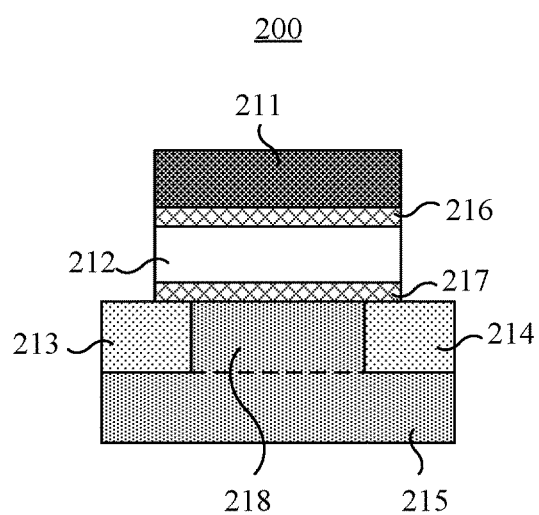
FIG. 4 is a schematic diagram of a floating gate field effect transistor according to some examples of the present disclosure.

Referring to FIG. 4, FIG. 4 shows a schematic structural diagram of a charge trapping transistor that may include a control gate 211, a charge trapping layer 212, a source 213, a drain 214, a substrate 215, an oxide layer 216 and a tunnel oxide layer 217. The source 213 and the drain 214 are disposed on the substrate 215. The examples of the present disclosure take an N channel charge trapping layer field effect transistor as an example. The substrate 215 may include a P type semiconductor material, while the source 213 and the drain 214 comprise an N type semiconductor material. A substrate material between the source 213 and the drain 214 may form a conductive channel 218. The charge trapping layer 212 covers the conductive channel 218. The tunnel oxide layer 217 is located between the charge trapping layer 212 and the conductive channel 218 to separate the charge trapping layer 212 from the source 213, the drain 214 and the conductive channel 218. The control gate 211 is disposed on the charge trapping layer 212, and the oxide layer 216 is disposed between the control gate 211 and the charge trapping layer 212 to separate the control gate 211 from the charge trapping layer 212. The oxide layer 216 and the tunnel oxide layer 217 are both made of an insulation material, e.g., silicon dioxide ($SiO_2$).

The charge trapping layer 212 is made of an insulation material of high charge trapping density. During data writing, the charge trapping layer 212 traps electrons, and the threshold voltage of the field effect transistor will change, so that the data is stored by such characteristics. During data erasing, holes in the channel are injected into the charge trapping layer 212 to neutralize the electrons in the charge trapping layer 212, thereby achieving erasing.

When electrons are trapped in the charge trapping layer, due to the shielding effect of electrons, a higher threshold voltage is needed to turn on the conductive channel. If a threshold voltage is recorded as $V_{th1}$ in the case where there is no trapped electron in the charge trapping layer, and a threshold voltage is recorded as $V_{th2}$ in the case where there are electrons trapped in the charge trapping layer, then it is assumed that a voltage greater than $V_{th1}$ but less than $V_{th2}$ is used to try to turn on the charge trapping transistor. If the charge trapping transistor is turned on, then it may be determined that no electrons are trapped in the charge trapping layer. If the charge trapping transistor is not turned on, then it may be determined that electrons are trapped in the charge trapping layer. Based on such logic, in the case where no electrons are trapped on the charge trapping layer, the charge trapping transistor is in a turn-on state, representing. In the case where electrons are trapped on the charge trapping layer, the charge trapping transistor is in a turn-off state, representing 0. Therefore, data can be stored by utilizing such different states. The threshold voltage of the charge trapping transistor is changed by injecting or trapping electrons in the charge trapping layer to achieve storage function.

Figure 5:
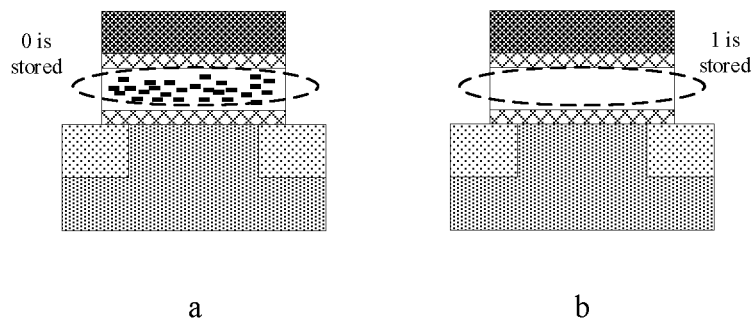
FIG. 5 is a schematic diagram of a floating gate field effect transistor storing data according to some examples of the present disclosure.

A voltage is applied at the control gate, and a tunneling effect occurs based on potential difference between the control gate and the channel, such that electrons may be injected into the charge trapping layer, or trapped by the charge trapping layer. During data storage, the data is stored in the charge trapping layer, and the presence or absence of charges in the charge trapping layer may be used to indicate the data currently stored in the memory cells. For example, referring to FIG. 5, as shown in part a of FIG. 5, a charged state of the charge trapping layer stores a state of 0, and as shown in part b of FIG. 5, an uncharged state of the charge trapping layer stores a state of 1.

In order to continuously increase the density and capacity of the memory, many memory designers and manufacturers have changed a two-dimensional (2D) integration mode, and utilize a three-dimensional stack technology to increase storage density of a NAND flash memory. In this context, the manufacturers wish to achieve shorter programming time during programming because this brings advantages in many aspects. Firstly, shorter programming time can accelerate a read-write speed of the data significantly. The programming is a process of performing a write operation on a single memory cell in the memory. With shorter programming time, these operations may be completed quickly, and the response speed and data transmission efficiency of the memory may be improved, thereby improving the overall performance of the system.

Secondly, shorter programming time is crucial to improve performance of a memory device. In the 3D NAND memory, the memory cells are stacked on multiple levels, which greatly improves storage density. However, long-time program process may result in mutual interference and cross interference between the memory cells, thereby affecting stability and data reliability of the memory. By shortening the programming time, the possibility of such interferences can be reduced, the stability of the memory is improved, and the problems such as data loss and miswriting, etc. are avoided, thereby enhancing the performance and reliability of the memory device.

At last, shorter programming time helps reduce the possibility of electron migration, thus prolonging the service life of the memory. In the memory, a long-time program operation may result in migration of electrons in fine structures, which causes data loss and bit flip, thereby reducing the life span of flash chip. By shortening the programming time, the loss caused by the electron migration can be reduced, and the service life of the memory is prolonged, thus improving the durability and reliability of the memory.

Therefore, how to reduce the programming time under the condition that the storage density is continuously increasing and the size of CMOS circuit design is increasingly smaller is a focus of the industry. One possible implementation is to reduce influence of a parasitic RC (Resistor-Capacitor) effect of a non-programmed memory string on a programmed memory string, so as to achieve improved programming time. The RC effect is a non-ideal effect commonly existing in an integrated circuit, and refers to influence generated by mutual coupling between a resistor and a capacitor. Such effect will lead to delay in circuit signal transmission and response, thus affecting the performance of the overall circuit. For example, during the programming, the parasitic RC effect of the non-programmed memory string will affect the programmed memory string, thus affecting the programming time of the programmed memory string. Thus, by reducing the RC effect, the signal transmission delay can be reduced, thereby improving the programming time.

Figure 6:
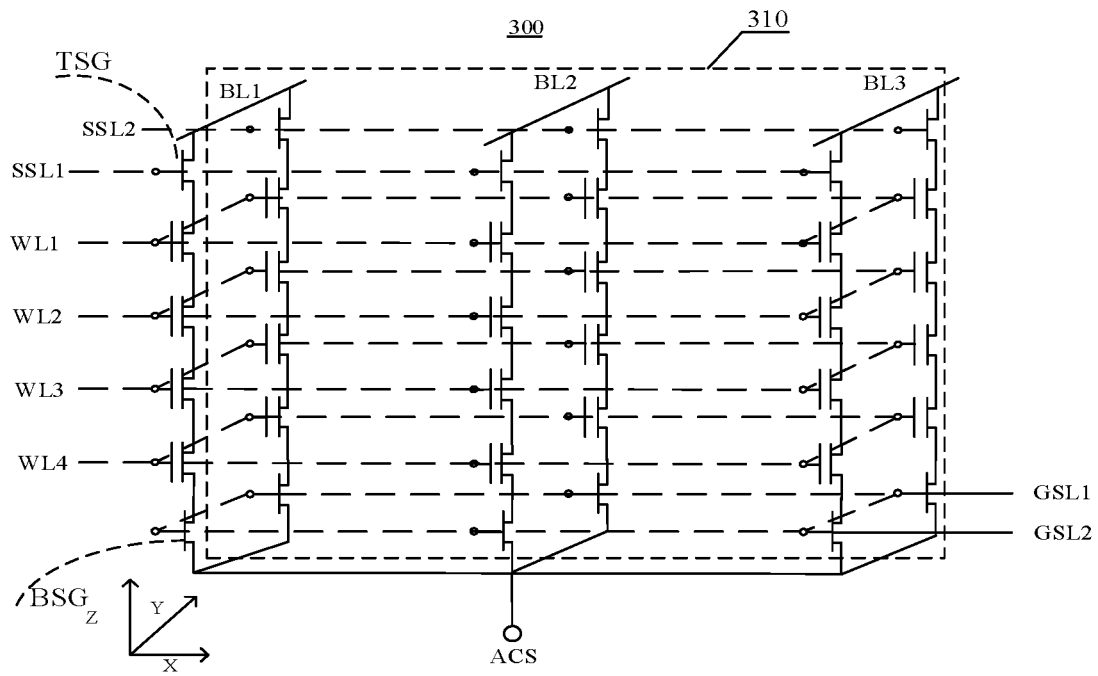
FIG. 6 is a schematic structural diagram of electrical connection of a memory cell array provided by examples of the present disclosure.
Figure 7:
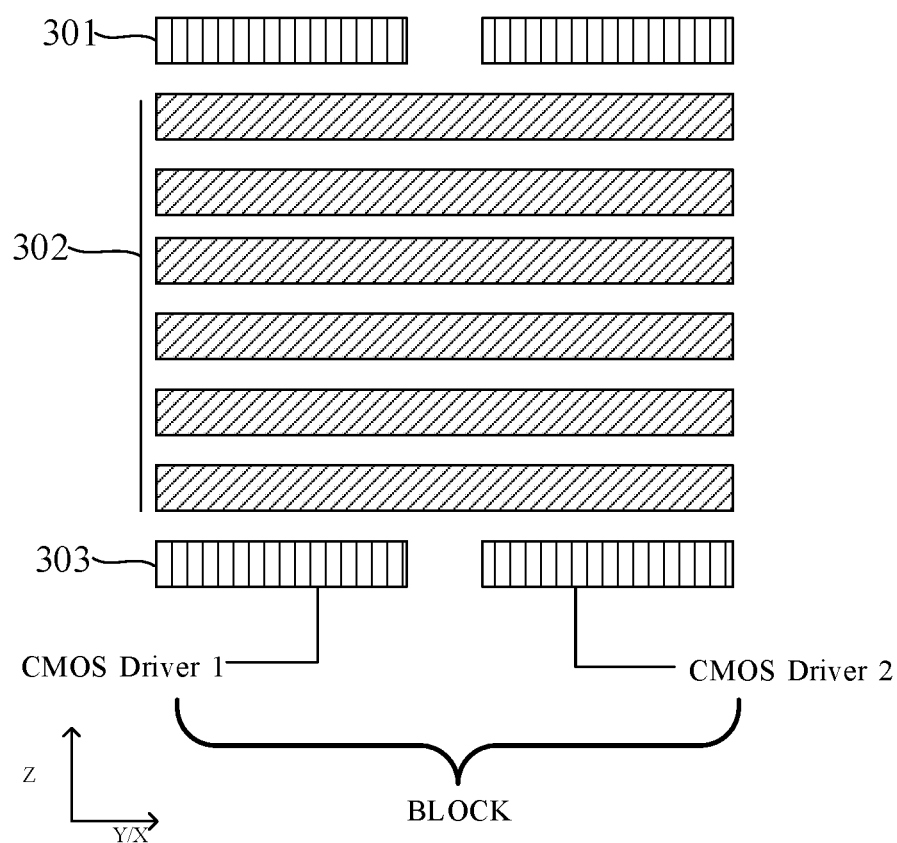
FIG. 7 is a schematic planar structural diagram of a memory device of the present disclosure.

In some examples, referring to FIG. 6, FIG. 6 shows a schematic structural diagram of electrical connection of a possible memory cell array 300. The memory cell array 300 may include a plurality of memory cell strings 310. Each memory cell string is coupled with a peripheral circuit through a string select line (SSL), a word line (WL), a bit line (BL), a ground select line (GSL), a source line (SL), etc. The memory cell string 310 may include a top select gate (TSG), a plurality of memory cells and a bottom select gate (BSG). With continued reference to FIG. 7, FIG. 7 is a view of FIG. 6 in a Y direction. The memory may include a top select gate layer 301, a word line 302 connected with the memory cells and a bottom select gate layer 303, wherein the top select gate layer 301 may include all top select gates connected with the same string select line, and the bottom select gate layer 303 may include all bottom select gates connected with the same ground select line. A bottom gate select cut is disposed between the bottom select gate layers 303 to separate the bottom select gate layers 303, such that during programming of a memory string corresponding to each separation region in the bottom select gate layer, memory strings corresponding to other separation regions are not affected. However, each separation region needs to be led out with one driving circuit. In the example of FIG. 7, since two separation regions are included, two driving circuits are needed, i.e., a driving circuit CMOS Driver 1 and a driving circuit CMOS Driver 2. Separate operations for each separation region can be achieved through the driving circuit CMOS Driver 1 and the driving circuit CMOS Driver 2, and electrical performance of the three-dimensional memory can be improved, for example, parasitic capacitance and coupling effect between the bottom select gate layer and an adjacent dielectric layer are reduced, and erasing time and data transmission time are reduced.

Further, when the bottom select gate layer 303 is separated by using the above separation method of the bottom gate select cut to create N separation regions, N driving circuits need to be disposed correspondingly. Thus, reducing parasitic RC effect by physical means needs improvements on circuit design and manufacturing, and there is a large amount of work in the process brought by making the bottom gate select cut. Therefore, although the programming time can be improved by reducing the parasitic RC effect using the separation method of the bottom gate select cut, the production cost is relatively high due to increased area cost and increased material cost. Also, the bottom select gates cannot be separated by taking the memory string as a minimum unit.

On this basis, the inventors propose an inventive concept of the present disclosure: on the premise of not making the bottom gate select cut between the memory strings for the bottom select gate layers, different bottom select gates in the bottom select gate layer are programmed to different threshold voltages, and different voltages are applied to different bottom select gates during a program verify process of the memory cells, such that selective turn-on of the bottom select gates is achieved, that is, the parasitic RC effect of the non-programmed memory string will not affect the programmed memory string, thus achieving an effect of electrical separation.

In order to solve the problems of high design difficulty and high process cost in the separation method of the bottom gate select cut, examples of the present disclosure provide a memory which may include a plurality of memory strings each comprising a source layer ACS, a bottom select gate layer and a gate layer, wherein the bottom select gate layer is located between the source layer ACS and the gate layer and may include a plurality of bottom select gates. The bottom select gates of the first memory string and the bottom select gates of the second memory string are connected with a same ground select line.

Figure 8:
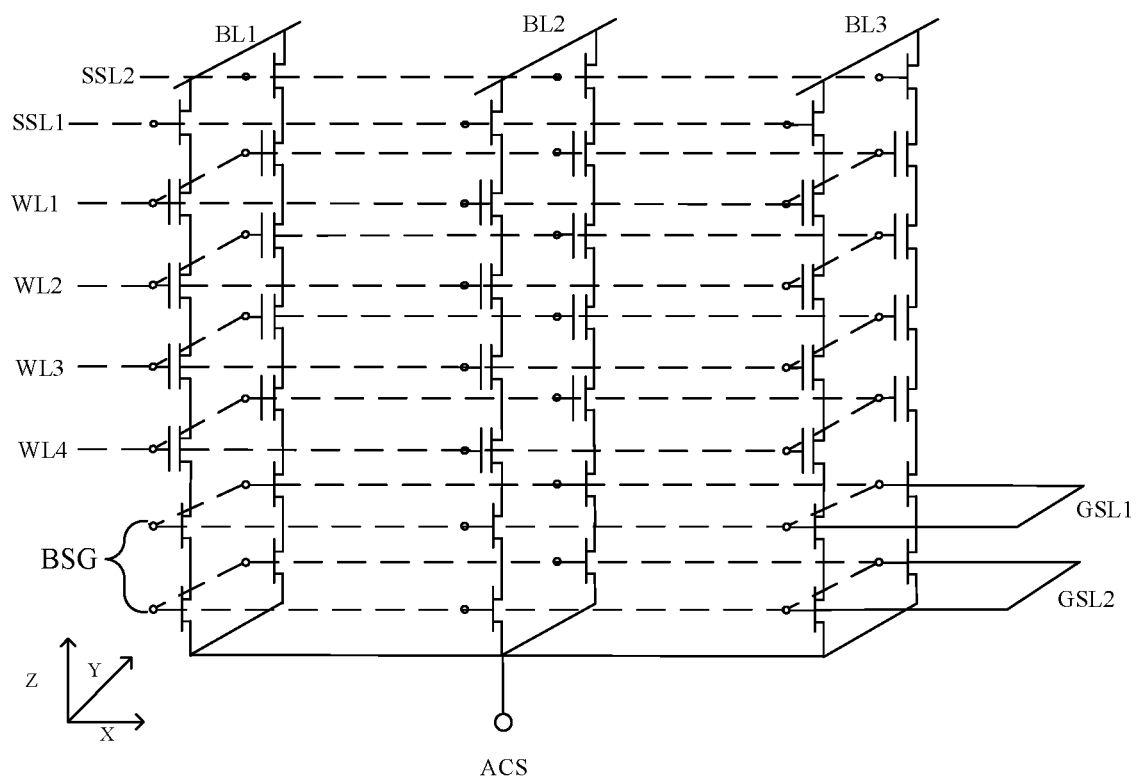
FIG. 8 is another schematic structural diagram of electrical connection of a memory cell array provided by examples of the present disclosure.

Referring to FIG. 8, there are a plurality of bottom select gate layers in the present disclosure, and the bottom select gates in different memory strings are all connected with the same ground select line. Moreover, in the same bottom select gate layer, referring to FIG. 9, for the bottom select gates in different memory strings, there is no bottom gate select cut for separation. As an example, first bottom select gates of the plurality of memory strings are all connected to a first ground select line GSL1, and second bottom select gates are all connected to a second ground select line GSL2. That is, the method of the bottom gate select cut is not used to isolate the bottom select gates in different memory strings.

Figure 9:
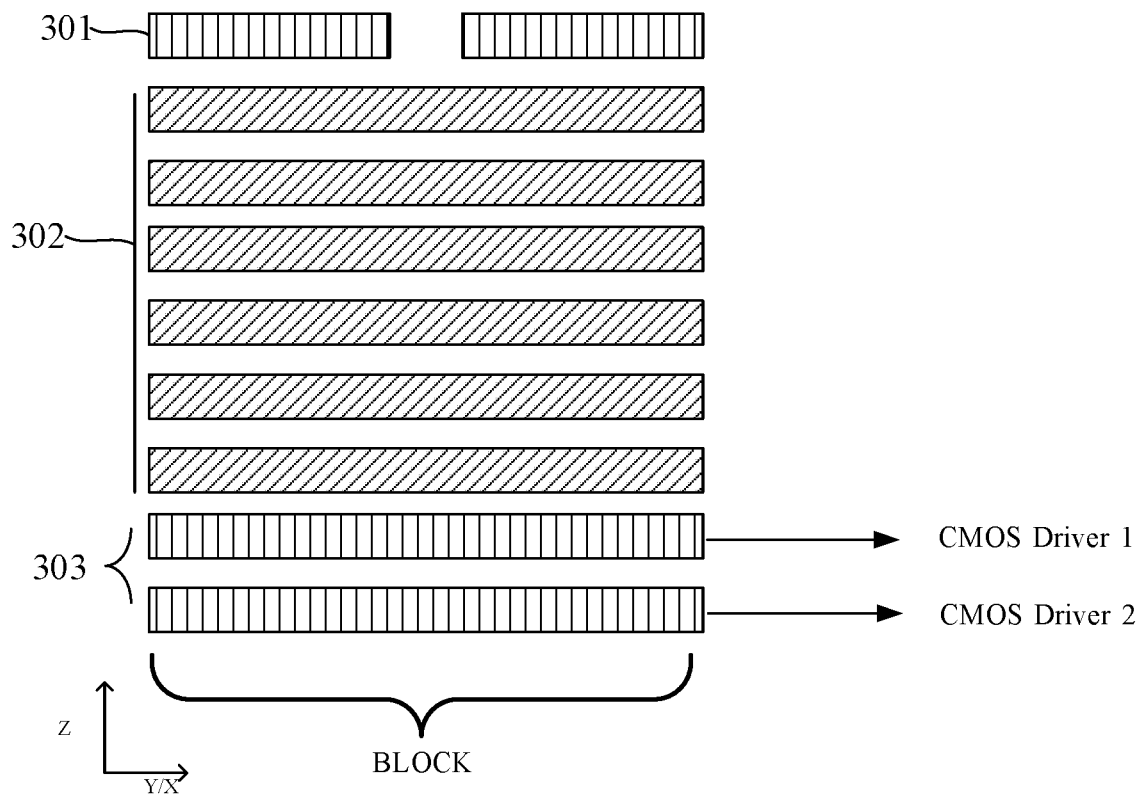
FIG. 9 is another schematic planar structural diagram of a memory device of the present disclosure.

As an example, with continued reference to FIG. 9, the memory may include the top select gate layer 301, the word line 302 connected with the memory cells, and the bottom select gate layer 303. The first ground select line GSL1 is connected with the driving circuit CMOS Driver 1, and the second ground select line GSL2 is connected with the driving circuit CMOS Driver 2.

Compared with the existing memory using the separation method of the bottom gate select cut, the solution provided by the examples of the present disclosure can reduce the number of corresponding driving circuits, reduce power consumption and simplify signal lines, thereby improving the performance and reliability of the overall system. In the present disclosure, the method of the bottom gate select cut is not used to separate the bottom select gates. Although the number of layers of the select gates is increased, the required production cost is much less than the production cost required by using the bottom gate select cut, and at the same time, potential manufacturing defects and reliability problems caused by the bottom gate select cut may be also reduced.

In one possible implementation of the present disclosure, the memory string may include the first bottom select gate and the second bottom select gate. The first bottom select gate of the first memory string and the first bottom select gate of the second memory string are connected with the first ground select line. The second bottom select gate of the first memory string and the second bottom select gate of the second memory string are connected with the second ground select line. A threshold voltage of the first bottom select gate in the first memory string is greater than a threshold voltage of the first bottom select gate in the second memory string, and a threshold voltage of the second bottom select gate in the first memory string is less than a threshold voltage of the second bottom select gate in the second memory string.

Figure 10:
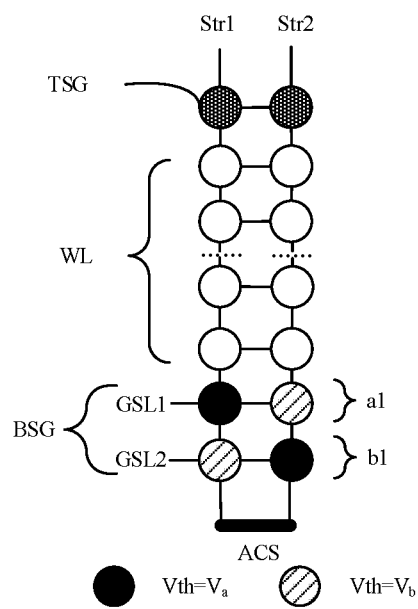
FIG. 10 is schematic cross-sectional structural diagram of a memory device of the present disclosure.

Referring to FIG. 10, an illustration is made by taking a memory string Str1 as the first memory string and a memory string Str2 as the second memory string as an example. The memory string Str1 and the memory string Str2 each comprise a first bottom select gate and a second bottom select gate.

In one example, the first bottom select gate is close to a side of a memory cell, the first bottom select gates on the memory string Str1 and the memory string Str2 are both connected to the first ground select line GSL1, and the second bottom select gates on the memory string Str1 and the memory string Str2 are both connected to the second ground select line GSL2. A first bottom select gate layer a1 may include all the first bottom select gates connected by the first ground select line GSL1, and a second bottom select gate layer b1 may include all the second bottom select gates connected by the second ground select line GSL2.

Figure 11:
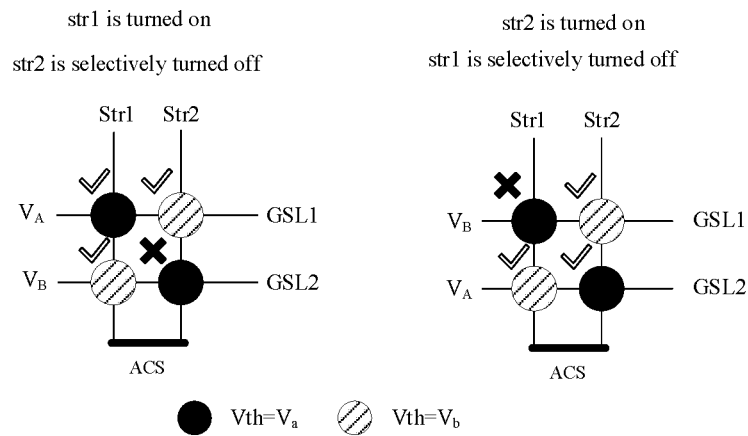
FIG. 11 is a schematic diagram of a process of selective turn-off of the present disclosure.

In one possible example, the threshold voltage of the corresponding bottom select gate is shown in FIG. 11. The threshold voltage of the first bottom select gate on the memory string Str1 close to the memory cell is a first threshold voltage $V_a$. The threshold voltage of the second bottom select gate on the memory string Str1 close to the source layer ACS is a second threshold voltage $V_b$. The threshold voltage of the first bottom select gate on the memory string Str2 close to the memory cell is the second threshold voltage $V_b$. The threshold voltage of the second bottom select gate on the memory string Str2 close to the source layer ACS is the first threshold voltage $V_a$.

It is to be noted that the first threshold voltage $V_a$ and the second threshold voltage $V_b$ in this example are relative values, and the first threshold voltage $V_a$ is greater than the second threshold voltage $V_b$. The threshold voltage of the bottom select gate on the memory string Str1 close to the memory cell may be the same as the threshold voltage of the bottom select gate on the memory string Str2 close to the source layer ACS, and the threshold voltage of the bottom select gate on the memory string Str1 close to the source layer ACS may be the same as the threshold voltage of the bottom select gate on the memory string Str2 close to the source layer ACS.

The case where the memory string Str1 and the memory string Str2 are selectively turned off will be further illustrated below in conjunction with FIG. 11.

For case of subsequent description, the naming method of the bottom select gate is illustrated, and the bottom select gate is named according to a position of the bottom select gate on the ground select line and a position of the bottom select gate on the memory string. If the bottom select gate is located on the Str1 and the first ground select line GSL1, the bottom select gate is labeled as G1Str1. Similarly, if the bottom select gate is located on the Str2 and the second ground select line GSL2, the bottom select gate is labeled as G2Str2.

As an example, the threshold voltages of the first bottom select gate G1Str1 on the memory string Str1 and the second bottom select gate G2Str2 on the memory string Str2 are both $V_a$, and the threshold voltages of the second bottom select gate G2Str1 on the memory string Str1 and the first bottom select gate G1Str2 on the memory string Str2 are both $V_b$. During a process of performing program verify on the memory cell on the memory string Str1, when selective turn-off of the memory string Str2 is achieved, a first voltage $V_A$ is applied to the first ground select line GSL1, and a second voltage $V_B$ is applied to the second ground select line GSL2, wherein the first voltage $V_A$ is greater than the second voltage $V_B$, the first voltage $V_A$ is greater than the threshold voltage $V_a$, the second voltage $V_B$ is greater than the threshold voltage $V_b$, and the second voltage $V_B$ is less than the threshold voltage $V_a$.

When the memory string Str1 is turned on and the memory string Str2 is selectively turned off, at the time the first voltage $V_A$ is applied to the first ground select line, since the first voltage $V_A$ is greater than the threshold voltage $V_a$ of the first bottom select gate G1Str1 on the memory string Str1 and the threshold voltage $V_b$ of the first bottom select gate G1Str2 on the memory string Str2, the first bottom select gates on the memory string Str1 and the memory string Str2 are both turned on.

When the second voltage $V_B$ is applied to the second ground select line GSL2, since the second voltage $V_B$ is greater than the threshold voltage $V_b$ of the second bottom select gate G2Str1 on the memory string Str1, the second bottom select gate G2Str1 on the memory string Str1 is turned on, while since the second voltage $V_B$ is less than the threshold voltage $V_a$ of the second bottom select gate G2Str2 on the memory string Str2, the second bottom select gate G2Str2 on the memory string Str2 is turned off.

Based on the above operation process, the first bottom select gate G1Str1 and the second bottom select gate G2Str1 on the memory string Str1 are both turned on, so the memory string Str1 is turned on; while the first bottom select gate G1Str2 on the memory string Str2 is turned on, and the second bottom select gate G2Str2 is turned off, so the memory string Str2 is selectively turned off.

When the memory string Str2 is turned on and the memory string Str1 is selectively turned off, the second voltage $V_B$ is applied to the first ground select line GSL1. Since the second voltage $V_B$ is less than the threshold voltage $V_a$ of the first bottom select gate G1Str1 on the memory string Str1, the first bottom select gate G1Str1 on the memory string Str1 is turned off; while since the second voltage $V_B$ is greater than the threshold voltage $V_b$ of the first bottom select gate G1Str2 on the memory string Str2, the first bottom select gate G1Str2 on the memory string Str2 is turned on.

When the first voltage $V_A$ is applied to the second ground select line GSL2, since the first voltage $V_A$ is greater than the threshold voltage $V_b$ of the second bottom select gate G2Str1 on the memory string Str1 and the threshold voltage $V_a$ of the second bottom select gate G2Str2 on the memory string Str2, the second bottom select gates on the memory string Str1 and the memory string Str2 are turned on, that is, G2Str1 and G2Str2 are turned on.

Based on the above operation process, the first bottom select gate G1Str2 and the second bottom select gate G2Str2 on the memory string Str2 are both turned on, so the memory string Str2 is turned on; while the first bottom select gate G1Str1 on the memory string Str1 is turned off and the second bottom select gate G2Str1 is turned on, so the memory string Str1 is selectively turned off.

According to the solution provided by the examples of the present disclosure, different threshold voltages are set for different bottom select gates in different bottom select gate layers, such that during a process of performing the program verify on the memory cell, selective turn-off of the select gates is achieved. After the select gates achieve the selective turn-off, the programmed memory string will be turned on, and the non-programmed memory string will be turned off, which achieves a reduced influence of parasitic RC effect of the non-programmed memory string on the programmed memory string, thus achieving an effect of reducing the programming time.

In one possible implementation of the present disclosure, there is no bottom gate select cut structure disposed at the bottom select gate layer of the memory, all the bottom select gates located on the same bottom select gate layer are connected with the same ground select line. The bottom select gates are programmed to different threshold voltages, and different voltages are applied to the plurality of ground select lines to achieve selective turn-on of the bottom select gates, so as to achieve control over various memory strings, thus achieving the objective of electrical separation. However, before that, the bottom select gates need to be programmed to different threshold voltages. The principle of programming the bottom select gates is substantially the same as the principle of programming the memory cell. In order to prevent programming of the bottom select gates from affecting data stored by the memory cell, a switch needs to be disposed to turn off the memory string during programming of the bottom select gates. In an example, for the memory provided by the examples of the present disclosure, the memory string further may include a third bottom select gate that is disposed between the second bottom select gate and the source layer ACS.

Figure 12:
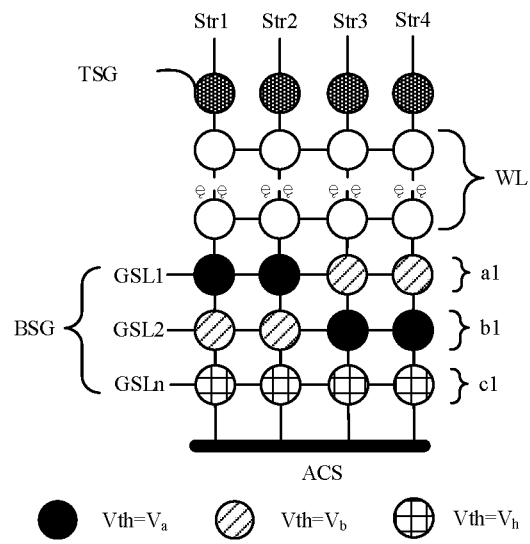
FIG. 12 is another schematic diagram of a memory device of the present disclosure.

Referring to FIG. 12, the memory string further may include a third bottom select gate, and the third bottom select gates on different memory strings are connected to a same third ground select line GSLn. That is, a third bottom select gate layer c1 may include all third bottom select gates connected by the third ground select line GSLn. A position of the third bottom select gate on the memory string is between the second bottom select gate and the source layer ACS. The first bottom select gate layer consisting of the first bottom select gates and the second bottom select gate layer consisting of the second bottom select gates may achieve selective turn-off of the bottom select gates through a combination of different threshold voltages. Thus, the threshold voltages of the first bottom select gates in the first bottom select gate layer are not all the same, and the threshold voltages of the second bottom select gates in the second bottom select gate layer are not all the same. For example, in conjunction with FIG. 12, the threshold voltages of the first bottom select gates on the memory string Str1 and the memory string Str2 are $V_a$, and the threshold voltages of the first bottom select gates on a memory string Str3 and a memory string Str4 are $V_b$, that is, the threshold voltages of the first bottom select gates in the first bottom select gate layer are not all the same. The threshold voltages of the second bottom select gates on the memory string Str1 and the memory string Str2 are $V_b$, and the threshold voltages of the second bottom select gates on the memory string Str3 and the memory string Str4 are $V_a$, that is, the threshold voltages of the second bottom select gates in the second bottom select gate layer are not all the same. The threshold voltages of the third select gates in the memory strings Str1, Str2, Str3 and Str4 are all $V_h$, that is, the threshold voltages of the third bottom select gates in a third bottom select gate layer are all the same. When the third bottom select gate programs the bottom select gates in the bottom select gate layer, the third bottom gate select gate can function to turn off the memory string.

In one possible implementation of the present disclosure, the threshold voltage of the first bottom select gate and the threshold voltage of the second bottom select gate are less than the threshold voltage of the third bottom select gate.

As an example, since the third bottom select gate needs to have the function of turn-off when programming the bottom select gates in the bottom select gate layer, the threshold voltage of the third bottom select gate needs to be much greater than the threshold voltage of the first bottom select gate and the threshold voltage of the second bottom select gate. As an example, the threshold voltage of the third bottom select gate is $V_h$, that is, the relationship of the threshold voltages is $V_h \gg V_a > V_b$.

In one possible implementation of the present disclosure, the number of the first bottom select gates and the second bottom select gates in the memory string is one or more.

Figure 13:
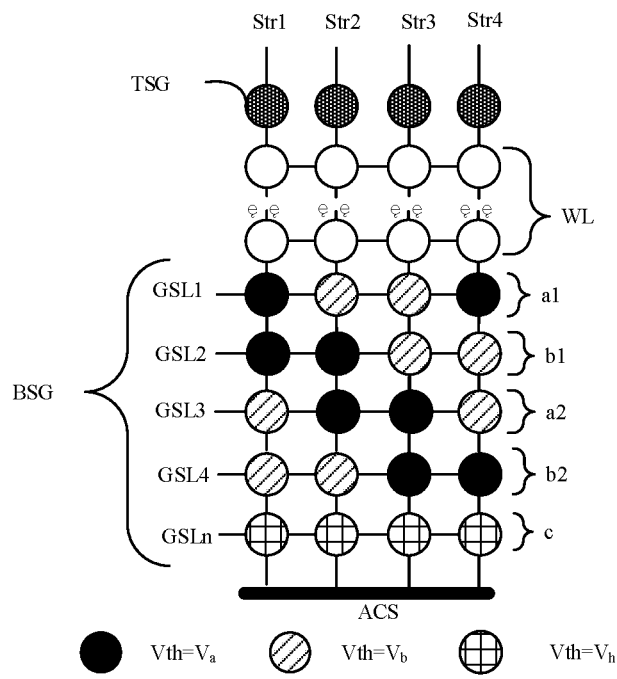
FIG. 13 is another schematic diagram of a memory device of the present disclosure.

When the numbers of the first bottom select gates and the second bottom select gates are both one, its specific implementation process is as shown in the above implementation. However, when the numbers of the first bottom select gates and the second bottom select gates are both multiple, the first bottom select gate layer and the second bottom select gate layer need to be disposed in a stack. Referring to FIG. 13, the first memory string may be any one of the memory string Str1, the memory string Str2, the memory string Str3 and the memory string Str4, and the second memory string may be any one of the memory string Str1, the memory string Str2, the memory string Str3 and the memory string Str4, but the first memory string and the second memory string cannot be the same. As an example, the memory string Str1 may include the first bottom select gates on one first bottom select gate layer a1, the second bottom select gates on one second bottom select gate layer b1, the first bottom select gates on one first bottom select gate layer a2, and the second bottom select gates on the second bottom select gate layer b2. Similarly, the memory string Str2 may include the first bottom select gates on one first bottom select gate layer a1, the second bottom select gates on one second bottom select gate layer b1, the first bottom select gates on one first bottom select gate layer a2, and the second bottom select gates on the second bottom select gate layer b2. The memory string Str3 may include the first bottom select gates on one first bottom select gate layer a1, the second bottom select gates on one second bottom select gate layer b1, the first bottom select gates on one first bottom select gate layer a2, and the second bottom select gates on the second bottom select gate layer b2. The memory string Str4 may include the first bottom select gates on one first bottom select gate layer a1, the second bottom select gates on one second bottom select gate layer b1, the first bottom select gates on one first bottom select gate layer a2, and the second bottom select gates on the second bottom select gate layer b2.

In this case, it may be achieved that, when the memory string Str1 is turned on, the memory string Str2, the memory string Str3 and the memory string Str4 are turned off selectively; when the memory string Str2 is turned on, the memory string Str1, the memory string Str3 and the memory string Str4 are turned off selectively; when the memory string Str3 is turned on, the memory string Str1, the memory string Str2 and the memory string Str4 are turned off selectively; and when the memory string Str4 is turned on, the memory string Str1, the memory string Str2 and the memory string Str3 are turned off selectively. Such separation method separates the bottom select gate layers by using a single memory string as a unit.

For ease of subsequent description, the naming method of the bottom select gate is illustrated, and the bottom select gate is named according to a position of the bottom select gate on the ground select line and a position of the bottom select gate on the memory string. If the bottom select gate is located on the Str1 and the first ground select line GSL1, the bottom select gate is labeled as G1Str1. Similarly, if the bottom select gate is located on the Str3 and a first ground select line GSL3, the bottom select gate is labeled as G3Str3.

Next, the turn-on process of each memory string will be illustrated below in conjunction with FIG. 13. When the memory string Str1 is turned on, and the memory string Str2, the memory string Str3 and the memory string Str4 are turned off selectively, its specific implementation process is as follows: applying the first voltage $V_A$ to the first ground select line GSL1 corresponding to the first bottom select gate layer a1, applying the first voltage $V_A$ to the second ground select line GSL2 corresponding to the second bottom select gate layer b1, applying the second voltage $V_B$ to the first ground select line GSL3 corresponding to the first bottom select gate layer a2, and applying the second voltage $V_B$ to the second ground select line GSL4 corresponding to the second bottom select gate layer b2. The first voltage $V_A$ is greater than the threshold voltage $V_a$, the second voltage $V_B$ is greater than the threshold voltage $V_b$, and the second voltage $V_B$ is less than $V_A$.

When the memory string Str1 is turned on, and the memory string Str2, the memory string Str3 and the memory string Str4 are turned off selectively, its specific implementation process is as follows:

When the first voltage $V_A$ is applied to the first ground select line GSL1, since the threshold voltages of the first bottom select gate G1Str1, the first bottom select gate G1Str2, the first bottom select gate G1Str3 and the first bottom select gate G1Str4 in the first bottom select gate layer are all less than the first voltage $V_A$, the first bottom select gate G1Str1, the first bottom select gate G1Str2, the first bottom select gate G1Str3 and the first bottom select gate G1Str4 are all turned on.

When the first voltage $V_A$ is applied to the second ground select line GSL2, since the second bottom select gate G2Str1, the second bottom select gate G2Str2, the second bottom select gate G2Str3 and the second bottom select gate G2Str4 in the second select gate layer are all less than the first voltage $V_A$, the second bottom select gate G2Str1, the second bottom select gate G2Str2, the second bottom select gate G2Str3 and the second bottom select gate G2Str4 are all turned on.

When the second voltage $V_B$ is applied to the first ground select line GSL3, since the threshold voltages of the first bottom select gate G3Str1 and the first bottom select gate G3Str4 in the first bottom select gate layer are less than the second voltage $V_B$, the first bottom select gate G3Str1 and the first bottom select gate G3Str4 are turned on; and since the threshold voltages of the first bottom select gate G3Str2 and the first bottom select gate G3Str3 are greater than the second voltage $V_B$, the first bottom select gate G3Str2 and the first bottom select gate G3Str3 are not turned on.

When the second voltage $V_B$ is applied to the second ground select line GSL4, since the threshold voltages of the second bottom select gate G4Str1 and the second bottom select gate G4Str2 in the second bottom select gate layer are less than the second voltage $V_B$, the second bottom select gate G4Str1 and the second bottom select gate G4Str2 are turned on; and since the threshold voltages of the second bottom select gate G4Str3 and the second bottom select gate G4Str4 are greater than the second voltage $V_B$, the second bottom select gate G4Str3 and the second bottom select gate G4Str4 are not turned on.

Based on the above operation process, the first bottom select gates G1Str1 and G3Str1, and the second bottom select gates G2Str1 and G4Str1 on the memory string Str1 are all turned on, so the memory string Str1 is turned on. The first bottom select gate G1Str2 on the memory string Str2 is turned on, the first bottom select gate G3Str2 is turned off, and the second bottom select gates G2Str2 and G4Str2 are turned on, so the memory string Str2 is selectively turned off. The first bottom select gate G1Str3 on the memory string Str3 is turned on, the second bottom select gate G2Str3 is turned on, the first bottom select gate G3Str3 is turned off, and the second bottom select gate G4Str3 is turned off, so the memory string Str3 is selectively turned off. The first bottom select gates G1Str4 and G3Str4 on the memory string Str4 are turned on, the second bottom select gate G2Str4 is turned on, and the second bottom select gate G4Str4 is turned off, so the memory string Str4 is selectively turned off.

When the memory string Str2 is turned on, and the memory string Str1, the memory string Str3 and the memory string Str4 are turned off selectively, its specific implementation process is as follows: applying the second voltage $V_B$ to the first ground select line GSL1 corresponding to the first bottom select gate layer a1, applying the first voltage $V_A$ to the second ground select line GSL2 corresponding to the second bottom select gate layer b1, applying the first voltage $V_A$ to the first ground select line GSL3 corresponding to the first bottom select gate layer a2, and applying the second voltage $V_B$ to the second ground select line GSL4 corresponding to the second bottom select gate layer b2.

When the second voltage $V_B$ is applied to the first ground select line GSL1, since the threshold voltages of the first bottom select gate G1Str2 and the first bottom select gate G1Str3 in the first bottom select gate layer are less than the second voltage $V_B$, the first bottom select gate G1Str2 and the first bottom select gate G1Str3 are turned on; and since the threshold voltages of the first bottom select gate G1Str1 and the first bottom select gate G1Str4 are greater than the second voltage $V_B$, the first bottom select gate G1Str1 and the first bottom select gate G1Str4 are not turned on.

When the first voltage $V_A$ is applied to the second ground select line GSL2, since the second bottom select gate G2Str1, the second bottom select gate G2Str2, the second bottom select gate G2Str3 and the second bottom select gate G2Str4 in the second select gate layer are all less than the first voltage $V_A$, the second bottom select gate G2Str1, the second bottom select gate G2Str2, the second bottom select gate G2Str3 and the second bottom select gate G2Str4 are all turned on.

When the first voltage $V_A$ is applied to the first ground select line GSL3, since the threshold voltages of the first bottom select gate G3Str1, the first bottom select gate G3Str2, the first bottom select gate G3Str3 and the first bottom select gate G3Str4 in the first bottom select gate layer are all less than the first voltage $V_A$, the first bottom select gate G3Str1, the first bottom select gate G3Str2, the first bottom select gate G3Str3 and the first bottom select gate G3Str4 are all turned on.

When the second voltage $V_B$ is applied to the second ground select line GSL4, since the threshold voltages of the second bottom select gate G4Str1 and the second bottom select gate G4Str2 are less than the second voltage $V_B$, the second bottom select gate G4Str1 and the second bottom select gate G4Str2 are turned on; and since the threshold voltages of the second bottom select gate G4Str3 and the second bottom select gate G4Str4 are greater than the second voltage $V_B$, the second bottom select gate G4Str3 and the second bottom select gate G4Str4 are not turned on.

Based on the above operation process, the first bottom select gate G1Str1 on the memory string Str1 is turned off, the first bottom select gate G3Str1 is turned on, and the second bottom select gates G2Str1 and G4Str1 are both turned on, so the memory string Str1 is selectively turned off. The first bottom select gates G1Str2 and G3Str2 on the memory string Str2 are both turned on, and the second bottom select gates G2Str2 and G4Str2 are both turned on, so the memory string Str2 is selectively turned on. The first bottom select gate G1Str3 on the memory string Str3 is turned on, the second bottom select gate G2Str3 is turned on, the first bottom select gate G3Str3 is turned on, and the second bottom select gate G4Str3 is turned off, so the memory string Str3 is selectively turned off. The first bottom select gate G1Str4 on the memory string Str4 is turned off, the first bottom select gate G3Str4 is turned on, the second bottom select gate G2Str4 is turned on, and the second bottom select gate G4Str4 is turned off, so the memory string Str4 is selectively turned off.

When the memory string Str3 is turned on, and the memory string Str1, the memory string Str2 and the memory string Str4 are turned off selectively, its specific implementation process is as follows: applying the second voltage $V_B$ to the first ground select line GSL1 corresponding to the first bottom select gate layer a1, applying the second voltage $V_B$ to the second ground select line GSL2 corresponding to the second bottom select gate layer b1, applying the first voltage $V_A$ to the first ground select line GSL3 corresponding to the first bottom select gate layer a2, and applying the first voltage $V_A$ to the second ground select line GSL4 corresponding to the second bottom select gate layer b2.

When the second voltage $V_B$ is applied to the first ground select line GSL1, since the threshold voltages of the first bottom select gate G1Str2 and the first bottom select gate G1Str3 in the first bottom select gate layer are less than the second voltage $V_B$, the first bottom select gate G1Str2 and the first bottom select gate G1Str3 are turned on; and since the threshold voltages of the first bottom select gate G1Str1 and the first bottom select gate G1Str4 are greater than the second voltage $V_B$, the first bottom select gate G1Str1 and the first bottom select gate G1Str4 are not turned on.

When the second voltage $V_B$ is applied to the second ground select line GSL2, since the threshold voltages of the second bottom select gate G2Str3 and the second bottom select gate G2Str4 are less than the second voltage $V_B$, the second bottom select gate G2Str3 and the second bottom select gate G2Str4 are turned on; and since the threshold voltages of the second bottom select gate G2Str1 and the second bottom select gate G2Str2 are greater than the second voltage $V_B$, the second bottom select gate G2Str1 and the second bottom select gate G2Str2 are not turned on.

When the first voltage $V_A$ is applied to the first ground select line GSL3, since the threshold voltages of the first bottom select gate G3Str1, the first bottom select gate G3Str2, the first bottom select gate G3Str3 and the first bottom select gate G3Str4 in the first bottom select gate layer are all less than the first voltage $V_A$, the first bottom select gate G3Str1, the first bottom select gate G3Str2, the first bottom select gate G3Str3 and the first bottom select gate G3Str4 are all turned on.

When the first voltage $V_A$ is applied to the second ground select line GSL4, since the second bottom select gate G4Str1, the second bottom select gate G4Str2, the second bottom select gate G4Str3 and the second bottom select gate G4Str4 in the second select gate layer are all less than the first voltage $V_A$, the second bottom select gate G4Str1, the second bottom select gate G4Str2, the second bottom select gate G4Str3 and the second bottom select gate G4Str4 are all turned on.

Based on the above operation process, the first bottom select gate G1Str1 on the memory string Str1 is turned off, the first bottom select gate G3Str1 is turned on, the second bottom select gate G2Str1 is turned off, and the second bottom select gate G4Str1 is turned on, so the memory string Str1 is selectively turned off. The first bottom select gates G1Str2 and G3Str2 on the memory string Str2 are both turned on, the second bottom select gate G2Str2 is turned off, and the second bottom select gate G4Str2 is turned on, so the memory string Str2 is selectively turned off. The first bottom select gates G1Str3 and G3Str3 on the memory string Str3 are both turned on, and the second bottom select gates G2Str3 and G4Str3 are both turned on, so the memory string Str3 is turned on. The first bottom select gate G1Str4 on the memory string Str4 is turned off, the first bottom select gate G3Str4 is turned on, and the second bottom select gates G2Str4 and G4Str4 are turned off, so the memory string Str4 is selectively turned off.

When the memory string Str4 is turned on, and the memory string Str1, the memory string Str2 and the memory string Str3 are turned off selectively, its specific implementation process is as follows: applying the first voltage $V_A$ to the first ground select line GSL1 corresponding to the first bottom select gate layer a1, applying the second voltage $V_B$ to the second ground select line GSL2 corresponding to the second bottom select gate layer b1, applying the second voltage $V_B$ to the first ground select line GSL3 corresponding to the first bottom select gate layer a2, and applying the first voltage $V_A$ to the second ground select line GSL4 corresponding to the second bottom select gate layer b2.

When the first voltage $V_A$ is applied to the first ground select line GSL1, since the threshold voltages of the first bottom select gate G1Str1, the first bottom select gate G1Str2, the first bottom select gate G1Str3 and the first bottom select gate G1Str4 in the first bottom select gate layer are all less than the first voltage $V_A$, the first bottom select gate G1Str1, the first bottom select gate G1Str2, the first bottom select gate G1Str3 and the first bottom select gate G1Str4 are all turned on.

When the second voltage $V_B$ is applied to the second ground select line GSL2, since the threshold voltages of the second bottom select gate G2Str3 and the second bottom select gate G2Str4 are less than the second voltage $V_B$, the second bottom select gate G2Str3 and the second bottom select gate G2Str4 are turned on; and since the threshold voltages of the second bottom select gate G2Str1 and the second bottom select gate G2Str2 are greater than the second voltage $V_B$, the second bottom select gate G2Str1 and the second bottom select gate G2Str2 are not turned on.

When the second voltage $V_B$ is applied to the first ground select line GSL3, since the threshold voltages of the first bottom select gate G3Str1 and the first bottom select gate G3Str4 in the first bottom select gate layer are less than the second voltage $V_B$, the first bottom select gate G3Str1 and the first bottom select gate G3Str4 are turned on; and since the threshold voltages of the first bottom select gate G3Str2 and the first bottom select gate G3Str3 are greater than the second voltage $V_B$, the first bottom select gate G3Str2 and the first bottom select gate G3Str3 are not turned on.

When the first voltage $V_A$ is applied to the second ground select line GSL4, since the second bottom select gate G4Str1, the second bottom select gate G4Str2, the second bottom select gate G4Str3 and the second bottom select gate G4Str4 in the second select gate layer are all less than the first voltage $V_A$, the second bottom select gate G4Str1, the second bottom select gate G4Str2, the second bottom select gate G4Str3 and the second bottom select gate G4Str4 are all turned on.

Based on the above operation process, the first bottom select gates G1Str1 and G3Str1 on the memory string Str1 are both turned on, the second bottom select gate G2Str1 is turned off, and the second bottom select gate G4Str1 is turned on, so the memory string Str1 is selectively turned off. The first bottom select gate G1Str2 on the memory string Str2 is turned on, the second bottom select gate G2Str2 is not turned on, the first bottom select gate G3Str2 is turned off, and the second bottom select gate G4Str2 is turned on, so the memory string Str2 is selectively turned off. The first bottom select gate G1Str3 on the memory string Str3 is turned on, the second bottom select gate G2Str3 is turned on, the first bottom select gate G3Str3 is turned off, and the second bottom select gate G4Str3 is turned on, so the memory string Str3 is selectively turned off. The first bottom select gates G1Str2 and G3Str2 on the memory string Str2 are both turned on, and the second bottom select gates G2Str2 and G4Str2 are both turned on, so the memory string Str4 is selectively turned on.

During a program verify process of the memory cell, potential difference will be generated in the channel mainly due to the fact that, the data will be read from the memory cell during the verify operation, thus resulting in a variation in a potential. When the potential difference is generated during the verify process, electrons obtain enough energy in a high electric field so as to pass through a heat insulation region of the semiconductor device and enter a heat insulation oxide layer or other insulation materials, leading to the hot carrier injection (HCI) problem. In the insulation materials, the hot carrier injection problem will cause the high-energy electrons to collide with lattice atoms, resulting in bond breakage and damages in the insulation materials. These damages may cause the insulation materials to gradually lose insulation property, thereby reducing reliability and life span of the transistor. After carriers in the transistor migrate to result in charge accumulation or leakage, a drift of the threshold voltage of the transistor occurs.

In order to avoid the hot carrier injection problem, the potential difference is buffered by disposing a dummy select gate layer composed of dummy select gates. The role of the dummy select gates is to absorb, buffer and balance these potential differences. Since the dummy select gate layer is not involved in actual circuit function, it can serve as a buffer region of the potential difference. When the potential difference is generated, the dummy select gate layer will absorb part of the influence of the potential difference, thereby reducing their possibility of being spread to other functional circuit portions and reducing the occurring possibility of the hot carrier injection problem.

In one possible implementation of the present disclosure, the plurality of bottom select gates further include dummy select gates, wherein at least one of the dummy select gates is disposed between any two of the bottom select gates with different threshold voltages, and the dummy select gate of the first memory string and the dummy select gate of the second memory string are connected with a dummy word line.

Figure 14:
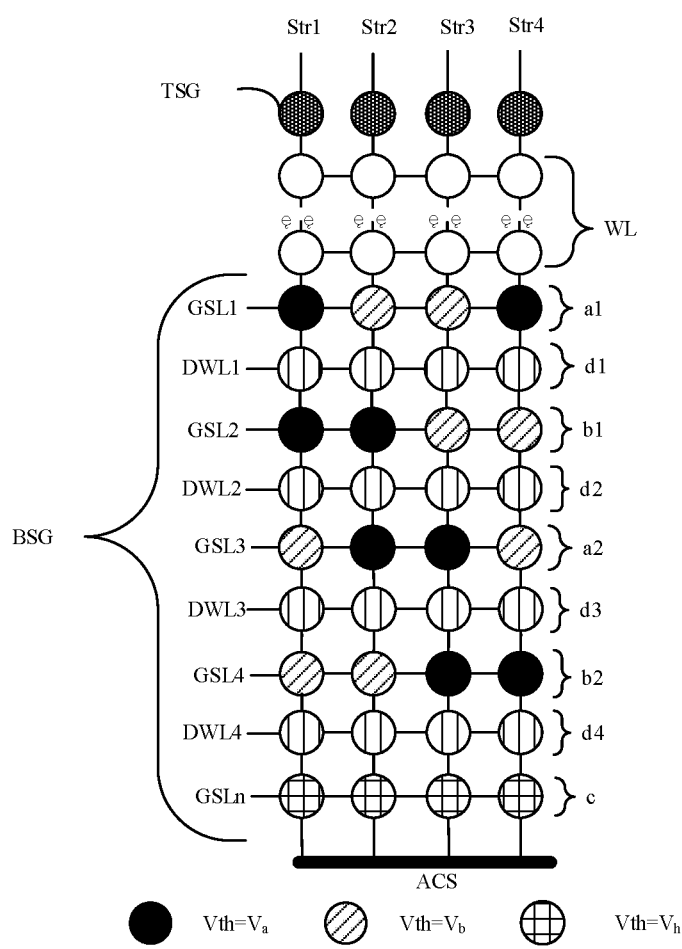
FIG. 14 is another schematic diagram of a memory device of the present disclosure.

For example, in conjunction with FIG. 14, the dummy select gates in different memory strings are connected to the same dummy word line DWL, that is, the dummy select gate layer may include all the dummy select gates connected by the dummy word line DWL. A first dummy select gate layer d1 is disposed between the first bottom select gate layer a1 and the second bottom select gate layer b1, and may include all dummy select gates connected by a dummy word line DWL1. A second dummy select gate layer d2 is disposed between the second bottom select gate layer b1 and the first bottom select gate layer a2, and may include all dummy select gates connected by a dummy word line DWL2. A third dummy select gate layer d3 is disposed between the first bottom select gate layer a2 and the second bottom select gate layer b2, and may include all dummy select gates connected by a dummy word line DWL3. A fourth dummy select gate layer d4 is disposed between the second bottom select gate layer b2 and the third bottom select gate layer c, and may include all dummy select gates connected by a dummy word line DWL4.

By means of such a structure in which the dummy select gate layers and the select gate layers are superposed layer by layer, the energy of electrons in a vertical direction will be effectively isolated into different energy levels. There are energy gaps between these energy levels, and the electrons cannot transit to other energy levels easily, thereby achieving an effect of a stepwise potential.

By programming the first bottom select gate and the second bottom select gate and adjusting their threshold voltages to a target value, the objective of selective turn-off is successfully achieved on the premise of not using the traditional separation method based on the bottom gate select cut.

Figure 15:
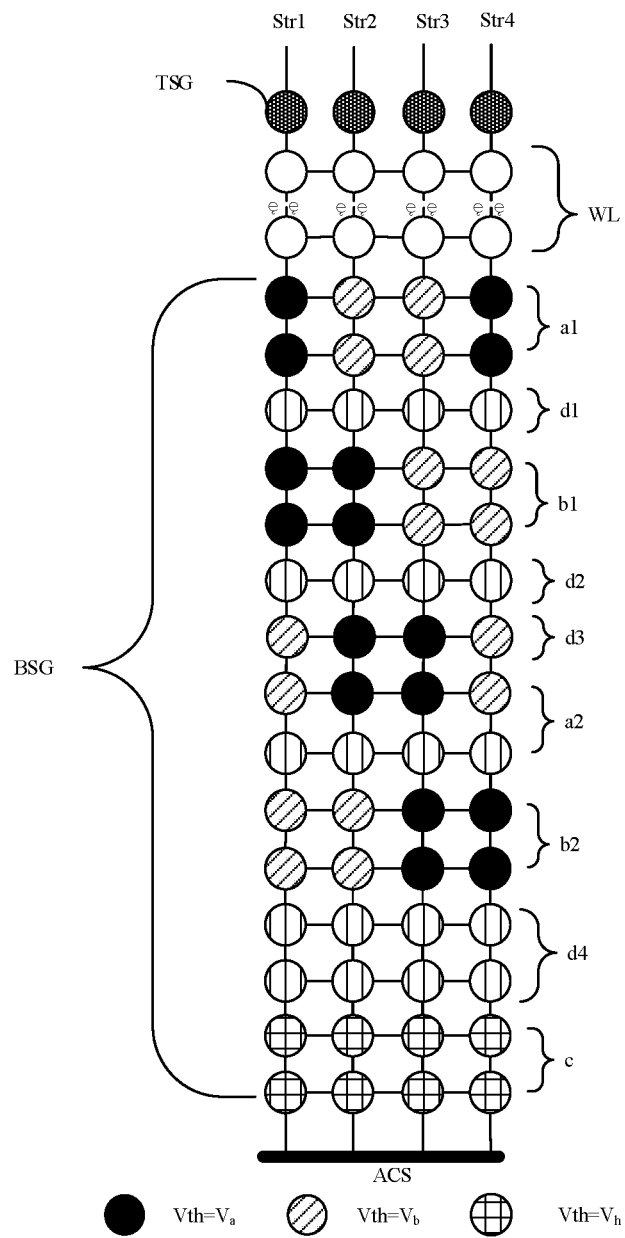
FIG. 15 is another schematic diagram of a memory device of the present disclosure.

In the above implementation, in order to avoid the failure of the memory string due to damage of a single bottom select gate, each first bottom select gate layer, each second bottom select gate layer and each third bottom select gate layer may further comprise a plurality of layers of redundant bottom select gates, wherein the first ground select line may be connected with the plurality of layers of redundant bottom select gates of the first bottom select gate layer, the second ground select line may be connected with the plurality of layers of redundant bottom select gates of the second bottom select gate layer, and the third ground select line may be connected with the plurality of layers of redundant bottom select gates of the third bottom select gate layer. That is, the first ground select line may comprise a plurality of word lines, and applying a turn-off voltage to the first ground select line may be understood as applying the same turn-off voltage to the plurality of word lines. Referring to FIG. 15, the first bottom select gate layer a1, the first bottom select gate layer a2, the second bottom select gate layer b1, the second bottom select gate layer b2 and the third bottom select gate layer c each at least comprise a layer of bottom select gates. The present disclosure does not impose a limitation on the specific number of redundant layers of the first bottom select gate layer, the second bottom select gate layer and the third bottom select gate layer.

The memory provided by the examples of the present disclosure uses an electrical separation method, instead of the separation method of the bottom gate select cut, which simplifies the manufacturing process of the memory. The separation method of the bottom gate select cut requires special processing steps, while program control can be achieved by voltage control, which reduces complicated manufacturing processes, so that the production cost is lowered, and the manufacturing efficiency and reliability of the memory are improved.

FIG. 16 shows a schematic structural diagram of a memory cell array and a peripheral circuit. In FIG. 16, the peripheral circuit 400 may include an I/O interface 410, a control logic 420, a row decoder 430, a voltage generator 440, a column decoder 450, a page buffer 460, a data bus 470 and a register 480. It is understood that in some examples, additional circuits not shown in FIG. 16 may be included as well.

The I/O interface 410 may be coupled to the control logic 420, and act as a control buffer to buffer and relay control commands received from a memory controller (e.g., the memory controller 111 in FIG. 2) to the control logic 420 and state information received from the control logic 420 to a host. The I/O interface 410 may be also coupled to the page buffer 460 via the data bus 470 and act as a data I/O interface 410 and a data buffer, to buffer and relay the data to and from the memory cell array 300.

The control logic 420 may be coupled to the voltage generator 440, the page buffer 460, the column decoder 450, the row decoder 430 and the I/O interface 410, etc., and configured to control operations of various peripheral circuits. The control logic 420 may generate an operation signal to control operations of the row decoder 430, the column decoder 450, the page buffer 460 and the voltage generator 440 in response to a command (CMD) or a control signal from the memory controller 111, wherein the command is a program command, read command, etc.

The row decoder 430 may supply a word line voltage generated by the voltage generator 440 to a selected word line and an unselected word line of the memory cell array 300 in response to control of the control logic 420. As described in detail below, the row decoder 430 is configured to perform program operation on memory cells coupled to one or more selected word lines of the memory cell array 300.

The voltage generator 440 may use an external supply voltage or an internal supply voltage to generate various voltages for performing erase, program, read and verify operations for the memory cell array 300. As an example, in the present disclosure, the voltage generator 440 is further used to apply a first program voltage and a second program voltage to the first ground select line in an erase stage to program the first bottom select gate and the second bottom select gate to different target threshold voltages, and to apply a first turn-on voltage to the first ground select line and apply a second turn-on voltage to the second ground select line in a verify stage to achieve selective turn-off of the bottom select gates.

The column decoder 450 may select one or more memory cell strings 310 in the memory cell array 300 in response to control of the control logic 420 and by applying a bit line voltage generated from the voltage generator 440.

The page buffer 460 may read and program (write) data from and to the memory cell array 300 according to control signals from the control logic 420. In one example, the page buffer 460 may store program data (write data) to be programmed into the memory cell array 300. In another example, the page buffer 460 may perform a program verify operation to ensure that the data has been properly programmed into the memory cells coupled to the selected word lines. In yet another example, the page buffer 460 may also detect a low power signal from the bit lines that represents data bits stored in the memory cells, and amplify a small voltage swing to a recognizable logic level in the read operation.

The register 480 may be coupled to the control logic 420 and include a state register, a command register, and an address register for storing state information, command operation codes (OP codes), and command addresses for controlling the operations of each peripheral circuit.

It should be understood by those skilled in the art that the operations performed by the row decoder 430, the page buffer 460, the control logic 420 and the voltage generator 440 as described in the present disclosure may be performed by a processing circuit. The processing circuit may include, but is not limited to, hardware of a logic circuit, or a combination of hardware and software of a processor executing software.

Referring to FIG. 17, an operation method of a memory provided by the examples of the present disclosure may include the following operations.

At S510, the method may include applying different voltages to a first ground select line and a second ground select line.

During a program verify process of a memory cell, different voltages are applied to the first ground select line and the second ground select line, which can achieve turn-on of a programmed memory string and selective turn-off of a non-programmed memory string, such that an influence of parasitic RC effect of the non-programmed memory string on the programmed memory string is reduced, signal transmission delay can be reduced, and thus the programming time is reduced.

In some examples, applying the different voltages to the first ground select line and the second ground select line may include the following operations.

At S5101, the method may include applying a first voltage to the first ground select line, and a second voltage to the second ground select line; or applying the second voltage to the first ground select line and the first voltage to the second ground select line.

As an example, the first voltage is greater than the second voltage. With continued reference to FIGS. 10 and 11, the threshold voltages of the first bottom select gate on the memory string Str1 and the second bottom select gate on the memory string Str2 are both $V_a$, and the threshold voltages of the second bottom select gate on the memory string Str1 and the first bottom select gate on the memory string Str2 are both $V_b$. The first voltage $V_A$ is applied to the first ground select line GSL1, and the second voltage $V_B$ is applied to the second ground select line GSL2, wherein the first voltage $V_A$ is greater than the second voltage $V_B$, the first voltage $V_A$ is greater than the threshold voltage $V_a$, the second voltage $V_B$ is greater than the threshold voltage $V_b$, and the second voltage $V_B$ is less than the threshold voltage Va.

When the memory string Str1 is turned on, and the memory string Str2 is selectively turned off, at the time the first voltage $V_A$ is applied to the first ground select line, since the first voltage $V_A$ is greater than the threshold voltage $V_a$ of the first bottom select gate on the memory string Str1 and the threshold voltage $V_b$ of the first bottom select gate on the memory string Str2, the first bottom select gates on the memory string Str1 and the memory string Str2 are turned on.

When the second voltage $V_B$ is applied to the second ground select line GSL2, since the second voltage $V_B$ is greater than the threshold voltage $V_b$ of the second bottom select gate on the memory string Str1, the second bottom select gate on the memory string Str1 is turned on; while since the second voltage $V_B$ is less than the threshold voltage $V_a$ of the second bottom select gate on the memory string Str2, the second bottom select gate on the memory string Str2 is turned off.

When the memory string Str2 is turned on, and the memory string Str1 is selectively turned off, the second voltage $V_B$ is applied to the first ground select line. Since the second voltage $V_B$ is less than the threshold voltage $V_a$ of the first bottom select gate on the memory string Str1, the first bottom select gate on the memory string Str1 is turned off. However, since the second voltage $V_B$ is greater than the threshold voltage $V_b$ of the first bottom select gate on the memory string Str2, the first bottom select gate on the memory string Str2 is turned on.

When the first voltage $V_A$ is applied to the second ground select line, since the first voltage $V_A$ is greater than the threshold voltage $V_b$ of the second bottom select gate on the memory string Str1 and the threshold voltage $V_a$ of the second bottom select gate on the memory string Str2, the second bottom select gates on the memory string Str1 and the memory string Str2 are turned on.

Based on the above operation process, the selective turn-off of the memory string Str2 can be achieved during a program verify process of the memory cell on the memory string Str1, that is, the parasitic RC effect of the non-programmed memory string Str2 does not affect the programmed memory string Str1, and an effect of electrical separation is achieved, thereby improving the programming time.

In some examples, the method provided by the present disclosure further may include the following operations.

At S5102, the method may include applying a third voltage to a third ground select line and applying a pass voltage to a dummy word line.

With continued reference to FIG. 14, when the memory string Str2, the memory string Str3 and the memory string Str4 are turned off selectively, its specific implementation process is as follows: applying the first voltage $V_A$ to the first ground select line GSL1 corresponding to the first bottom select gate layer a1, applying the first voltage $V_A$ to the second ground select line GSL2 corresponding to the second bottom select gate layer b1, applying the second voltage $V_B$ to the first ground select line GSL3 corresponding to the first bottom select gate layer a2, and applying the second voltage $V_B$ to the second ground select line GSL4 corresponding to the second bottom select gate layer b2. The first voltage $V_A$ is greater than the threshold voltage $V_a$, the second voltage $V_B$ is greater than the threshold voltage $V_b$, and the second voltage $V_B$ is less than $V_A$.

The third voltage $V_H$ is applied to the third ground select line, and the third voltage $V_H$ is greater than $V_h$, such that during the above operation process, the third bottom select gates are all in a turn-on state, while the pass voltage Vpass is applied to all the dummy word lines DWL1, DWL2, DWL3 and DWL4.

Before applying the different voltages to the ground select lines, the method further may include programming the bottom select gates.

At S501, the method may include programming the first bottom select gate and the second bottom select gate to make the first bottom select gate and the second bottom select gate be programmed to different target threshold voltages.

In the existing memory using the separation method of the bottom gate select cut, the threshold voltages of its bottom select gates are all the same, which leads to failure of separately controlling some specific select gate to be turned on or turned off without affecting other select gates, thereby failing to achieve selective turn-off. Therefore, in order to achieve selective turn-off on the premise of not using the separation method of the bottom gate select cut, different bottom select gates in the bottom select gate layer need to be programmed to different threshold voltages. By means of accurate program control, the desired select gates can be programmed to different target threshold voltages.

During a program verify process of a memory cell, different voltages are applied to the first ground select line and the second ground select line, which can achieve turn-on of a programmed memory string and selective turn-off of a non-programmed memory string, such that an influence of parasitic RC effect of the non-programmed memory string on the programmed memory string is reduced, signal transmission delay can be reduced, and thus the programming time is reduced.

In some examples, programming the first bottom select gate and the second bottom select gate to make the first bottom select gate and the second bottom select gate be programmed to the different target threshold voltages may include the following operations.

For instance, at S5011, the method may include programming the first bottom select gate of the first memory string and the first bottom select gate of the second memory string when a first program voltage is applied to the first ground select line, and programming the first bottom select gate of the first memory string and preventing the first bottom select gate of the second memory string from being programmed when a second program voltage is applied to the first ground select line.

As an example, taking programming the select gates of the first bottom select gate layer as an example. First, when the select gates of the first bottom select gate layer are programmed, the first program voltage is applied to the first ground select line GSL1 to adjust the threshold voltages of all the select gates of all the first bottom select gate layers to a voltage value corresponding to a second threshold voltage state, that is, to make the threshold voltages of the second bottom select gates on the memory string Str2 reach a target value; then, when the second program voltage is applied to the first ground select line GSL1, the first bottom select gates on the memory string Str2 are prevented from being programmed at the same time to adjust the first bottom select gates on the memory string Str1 to a voltage value corresponding to a first program voltage state, and the second program voltage needs to be greater than the first program voltage.

In some examples, an operation process of programming the first bottom select gate and the second bottom select gate to make them have different threshold voltages will be illustrated specifically below.

At S50111, the method may include a turn-on voltage is applied to a first string select line and a second string select line.

At S50112, the method may include a turn-on voltage is applied to the first string select line, and a turn-off voltage is applied to the second string select line.

As an example, the first string select line SSL1 is coupled to a top select gate of the first memory string, and the second string select line SSL2 is coupled to a top select gate of the second memory string. The illustration is continued with the above example. When the first program voltage is applied to the first ground select line GSL1, the turn-on voltage is applied to the first string select line SSL1 and the second string select line SSL2 simultaneously to adjust the threshold voltages of the first bottom select gate on the memory string Str1 and the first bottom select gate on the memory string Str2 to the voltage value $V_b$ corresponding to the second threshold voltage state. When the second program voltage is applied to the first ground select line GSL1, the turn-on voltage is applied to the first string select line SSL1, and the turn-off voltage is applied to the second string select line SSL2 to adjust the first bottom select gate on the memory string Str1 to the voltage value $V_a$ corresponding to the first threshold voltage state.

Examples of the present disclosure further provide a memory system. For example, the memory system may include the memory in the aforementioned examples, and a controller. The memory is coupled with the controller. In an example, the memory system may be the aforementioned memory system shown in FIG. 2 or 3.

Examples of the present disclosure further provide an electronic apparatus comprising a host and the aforementioned memory system, wherein the host is connected with the memory system. In an example, the electronic apparatus may be the electronic apparatus shown in FIG. 1 in the preceding examples.

In the present disclosure, according to the memory provided, the bottom select gate layers are not separated by the bottom gate select cut, and the bottom select gates corresponding to different finger memory areas are connected with the same ground select line. Therefore, each layer of bottom select gates needs only one circuit lead-out. Such a design simplifies the structure, reduces circuit complexity and routing difficulty, and lowers manufacturing and maintenance costs. By setting different threshold voltages to the bottom select gates on different bottom select gate layers and different memory strings, and by applying different turn-on voltages in a program verify state, the selective turn-off of the bottom select gates is achieved. Therefore, during the program verify process of the memory cell, by reducing the influence of parasitic RC effect of the non-programmed memory string on the programmed memory string, signal transmission delay can be reduced, thus reducing the programming time.

In several examples provided by the present disclosure, it should be understood that the provided programming method and memory may be implemented by other means. For example, the division of some module is only a division of logical functions. In some examples, there may be other means of division. For example, a plurality of units or components may be combined, or may be integrated into another system, or some features can be ignored or not performed.

Those of ordinary skill in the art can recognize that the modules and algorithm steps of various examples as described in conjunction with the examples disclosed herein can be implemented in an electronic hardware, or a combination of a computer software and an electronic hardware. Whether these functions are performed by means of hardware or software depends on particular applications and design constraints of the technical solution. Professional technicians can implement the described function using different methods for each particular application, but such implementation should not be considered as beyond the scope of the present disclosure.

The above descriptions are merely some examples of the present disclosure, and the protection scope of the present disclosure is not limited to those. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory device, comprising:
   a memory cell array, comprising:
   a source layer, a bottom select gate layer and a gate layer, the bottom select gate layer is located between the source layer and the gate layer, wherein the bottom select gate layer comprises bottom select gates, the bottom select gates respectively correspond to memory strings, the memory strings comprising a first memory string and a second memory string, and a bottom select gate of the first memory string and a bottom select gate of the second memory string connected with a same select line; and
   a peripheral circuit coupled to the select line, wherein the peripheral circuit is configured to:
   apply a selection voltage to the select line to control the first memory string and the second memory string.

2. The memory device of claim 1, wherein the bottom select gate layer comprises a first bottom select gate layer and a second bottom select gate layer, the second bottom select gate layer is disposed between the first bottom select gate layer and the source layer, the first bottom select gate layer comprises first bottom select gates, and the second bottom select gate layer comprises second bottom select gates;
   a first bottom select gate of the first memory string and a first bottom select gate of the second memory string are connected with a first select line; and
   a second bottom select gate of the first memory string and a second bottom select gate of the second memory string are connected with a second select line.

3. The memory device of claim 2, wherein threshold voltages of the first bottom select gates in the first memory string are greater than threshold voltages of the first bottom select gates in the second memory string; and
   threshold voltages of the second bottom select gates in the first memory string are less than threshold voltages of the second bottom select gates in the second memory string.

4. The memory device of claim 3, wherein the bottom select gate layer further comprises a third bottom select gate layer, the third bottom select gate layer comprises third bottom select gates, and a third bottom select gate of the first memory string and a third bottom select gate of the second memory string are connected with a third select line; and
   the third bottom select gate layer is disposed between the second bottom select gate layer and the source layer, and threshold voltages of the third bottom select gates connected with the third select line are the same.

5. The memory device of claim 4, wherein threshold voltages of the first bottom select gates and threshold voltages of the second bottom select gates are both less than threshold voltages of the third bottom select gates.

6. The memory device of claim 5, wherein the bottom select gate layer further comprises a dummy select gate layer, the dummy select gate layer comprises dummy select gates, wherein at least one of the dummy select gates is disposed between any two of the bottom select gates with different threshold voltages, and a dummy select gate of the first memory string and a dummy select gate of the second memory string are connected with a dummy word line.

7. The memory device of claim 6, wherein a number of the first bottom select gates and the second bottom select gates in a memory string is one or more.

8. The memory device of claim 6, wherein a number of the third bottom select gates in a memory string is one or more.

9. The memory device of claim 6, wherein the first memory string and the second memory string are located in different finger memory areas of the memory cell array.

10. An operation method of a memory device, comprising:
    programming a first bottom select gate and a second bottom select gate to make the first bottom select gate and the second bottom select gate be programmed to different target threshold voltages; and
    applying different voltages to a first select line and a second select line, wherein the first select line is coupled with the first bottom select gate, and the second select line is coupled with the second bottom select gate.

11. The operation method of claim 10, wherein a threshold voltage of the first bottom select gate in a first memory string is greater than a threshold voltage of the first bottom select gate in a second memory string, and a threshold voltage of the second bottom select gate in the first memory string is less than a threshold voltage of the second bottom select gate in the second memory string, and the applying the different voltages to the first select line and the second select line comprises:
    applying a first voltage to the first select line, and applying a second voltage to the second select line, wherein the first voltage is greater than the second voltage.

12. The operation method of claim 11, further comprising:
    applying a third voltage to a third select line, wherein the third select line is coupled with a third bottom select gate; and
    applying a pass voltage to a dummy word line, wherein the dummy word line is coupled with a dummy select gate.

13. The operation method of claim 10, wherein the programming the first bottom select gate and the second bottom select gate to make the first bottom select gate and the second bottom select gate be programmed to the different target threshold voltages comprises:
    programming the first bottom select gate of a first memory string and the first bottom select gate of a second memory string when applying a first program voltage to the first select line; and
    programming the first bottom select gate of the first memory string and preventing the first bottom select gate of the second memory string from being programmed when applying a second program voltage to the first select line.

14. The operation method of the memory of claim 13, wherein the programming the first bottom select gate of the first memory string and the first bottom select gate of the second memory string comprises:

applying a turn-on voltage to a first string select line and a second string select line, wherein the first string select line is coupled to a top select gate of the first memory string, and the second string select line is coupled to a top select gate of the second memory string.

15. The operation method of the memory of claim 13, wherein the programming the first bottom select gate of the first memory string and preventing the first bottom select gate of the second memory string from being programmed comprises:

applying a turn-on voltage to a first string select line and a turn-off voltage to a second string select line, wherein the first string select line is coupled to a top select gate of the first memory string, and the second string select line is coupled to a top select gate of the second memory string.

16. A memory system, comprising:
a memory controller; and
a memory device, comprising:
a source layer, a bottom select gate layer and a gate layer, the bottom select gate layer is located between the source layer and the gate layer, wherein the bottom select gate layer comprises bottom select gates, the bottom select gates respectively correspond to memory strings, the memory strings comprising a first memory string and a second memory string, and a bottom select gate of the first memory string and a bottom select gate of the second memory string connected with a same s elect line; and
a peripheral circuit coupled to the select line, wherein the peripheral circuit is configured to:
apply a selection voltage to the select line to control the first memory string and the second memory string.

17. The memory system of claim 16, wherein the bottom select gate layer comprises a first bottom select gate layer and a second bottom select gate layer, the second bottom select gate layer is disposed between the first bottom select gate layer and the source layer, the first bottom select gate layer comprises first bottom select gates, and the second bottom select gate layer comprises second bottom select gates;

a first bottom select gate of the first memory string and a first bottom select gate of the second memory string are connected with a first select line; and
a second bottom select gate of the first memory string and a second bottom select gate of the second memory string are connected with a second select line.

18. The memory system of claim 17, wherein threshold voltages of the first bottom select gates in the first memory string are greater than threshold voltages of the first bottom select gates in the second memory string; and threshold voltages of the second bottom select gates in the first memory string are less than threshold voltages of the second bottom select gates in the second memory string.

19. The memory system of claim 18, wherein the bottom select gate layer further comprises a third bottom select gate layer, the third bottom select gate layer comprises third bottom select gates, and a third bottom select gate of the first memory string and a third bottom select gate of the second memory string are connected with a third select line; and the third bottom select gate layer is disposed between the second bottom select gate layer and the source layer, and threshold voltages of the third bottom select gates connected with the third select line are the same.

20. The memory system of claim 19, wherein threshold voltages of the first bottom select gates and threshold voltages of the second bottom select gates are both less than threshold voltages of the third bottom select gates.

* * * * *